US012662137B2

(12) United States Patent
dos Reis Costa et al.

(10) Patent No.: US 12,662,137 B2
(45) Date of Patent: Jun. 23, 2026

(54) SHARED DECISION-MAKING WITH COGNITIVE PRIORS

(71) Applicant: Toyota Research Institute, Inc., Los Altos, CA (US)

(72) Inventors: Jean Marcel dos Reis Costa, San Jose, CA (US); Guy Rosman, Cambridge, MA (US); Deepak Edakkattil Gopinath, Washington, DC (US); Emily Sumner, Mountain View, CA (US); Thomas Balch, Somerville, MA (US); Jonathan DeCastro, Arlington, MA (US); Andrew Michael Silva, Cambridge, MA (US); Laporsha Trinati Dees, Boston, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 18/603,887

(22) Filed: Mar. 13, 2024

(65) Prior Publication Data

US 2025/0121832 A1     Apr. 17, 2025

Related U.S. Application Data

(60) Provisional application No. 63/589,502, filed on Oct. 11, 2023.

(51) Int. Cl.
*G06F 17/00*     (2019.01)
*B60W 50/00*     (2006.01)
*G06N 3/09*     (2023.01)

(52) U.S. Cl.
CPC ........... *B60W 50/0097* (2013.01); *G06N 3/09* (2023.01); *B60W 2050/0028* (2013.01)

(58) Field of Classification Search
CPC ...... B60W 50/0097; B60W 2050/0028; G06N 3/09

(Continued)

(56) References Cited

U.S. PATENT DOCUMENTS

| | | | |
|---|---|---|---|
| 10,289,113 B2 | 5/2019 | Perkins et al. | |
| 11,242,054 B2 | 2/2022 | Isele | |

(Continued)

OTHER PUBLICATIONS

Vision-Based Autonomous Vehicle Systems Based on Deep Learning: A Systematic Literature Review (Year: 2022).*

(Continued)

*Primary Examiner* — Ronnie M Mancho
(74) *Attorney, Agent, or Firm* — Christopher G. Darrow; Darrow Mustafa PC

(57)     ABSTRACT

Systems, methods, and other embodiments described herein relate to integrating human decision-making into a model-based system. In one embodiment, a method includes acquiring sensor data, including driver data about a driver of a vehicle and driving data about the vehicle and a surrounding environment of the vehicle. The method includes encoding, using a world encoder, the sensor data into a latent representation. The method includes determining human decision-making characteristics according to the latent representation. The method includes generating a control signal for providing shared control of the vehicle according to the human decision-making characteristics and the latent representation.

20 Claims, 8 Drawing Sheets

(58) Field of Classification Search
USPC ........................................................ 701/22
See application file for complete search history.

(56)                     References Cited

U.S. PATENT DOCUMENTS

| | | | |
|---|---|---|---|
| 11,759,951 | B2 | 9/2023 | Tian et al. |
| 12,217,170 | B2 * | 2/2025 | George .................... G06N 3/08 |
| 12,243,327 | B2 * | 3/2025 | Arditi .................. G05D 1/0274 |
| 12,271,796 | B2 * | 4/2025 | Louizos ................. G06N 20/10 |
| 12,277,483 | B2 * | 4/2025 | Kranski ................. G06N 20/00 |
| 12,318,933 | B2 * | 6/2025 | Wales ................... G06T 19/006 |
| 12,322,068 | B1 * | 6/2025 | Kim .......................... G06T 5/60 |
| 12,333,639 | B2 * | 6/2025 | Tumanov ............. G06N 3/0475 |
| 2015/0284010 | A1 | 10/2015 | Beardsley et al. |
| 2020/0174471 | A1 | 6/2020 | Du et al. |
| 2023/0085422 | A1 | 3/2023 | Huang et al. |
| 2023/0104027 | A1 | 4/2023 | Wulfe et al. |
| 2025/0068860 | A1 * | 2/2025 | Poupyrev ............. G06F 16/338 |
| 2025/0086978 | A1 * | 3/2025 | Bangalore Ravi .. B60W 60/001 |
| 2025/0094454 | A1 * | 3/2025 | Poupyrev ........... G06F 16/3344 |
| 2025/0117625 | A1 * | 4/2025 | Song ...................... G06N 3/045 |
| 2025/0121832 | A1 * | 4/2025 | dos Reis Costa ........ G06N 3/09 |
| 2025/0206354 | A1 * | 6/2025 | Weast ................. B60W 30/095 |
| 2025/0217638 | A1 * | 7/2025 | Lin ......................... G06N 3/08 |
| 2025/0225779 | A1 * | 7/2025 | Rambach ............... G06V 10/82 |

OTHER PUBLICATIONS

Asmar et al., "Collaborative Decision Making Using Action Suggestions", arXiv:2209.13160v1, Sep. 27, 2022, 14 pages.

Pilarski et al., "Learned human-agent decision-making, communication and joint action in a virtual reality environment", arXiv:1905.02691v1, May 7, 2019, 5 pages.

Gao et al., "Bootstrapping Adaptive Human-Machine Interfaces with Offline Reinforcement Learning", arXiv:2309.03839v1, Sep. 7, 2023, 12 pages.

Xu et al., "Decision-aid or Controller? Steering Human Decision Makers with Algorithms", arXiv:2303.13712v1, Mar. 23, 2023, 23 pages.

* cited by examiner

SHARED DECISION-MAKING WITH COGNITIVE PRIORS

CROSS-REFERENCE TO RELATED APPLICATIONS

This application claims benefit of U.S. Provisional Application No. 63/589,502, filed on, Oct. 11, 2023, which is herein incorporated by reference in its entirety.

TECHNICAL FIELD

The subject matter described herein relates, in general, to systems and methods for integrating human decision-making into a model-based system and, more particularly, to using reinforcement learning to learn a latent representation that integrates nuances of human decision-making.

BACKGROUND

Within the context of automated vehicles (e.g., semi-autonomous, autonomous, etc.), systems within the vehicle improve safety by, in various arrangements, perceiving the environment around the vehicle and predicting actions of agents (e.g., other vehicles, pedestrians, etc.) within the surrounding environment. From this information, the vehicle systems are able to generally assess states of the agents and predict interactions. However, the vehicle systems do not consider aspects of human decision-making when assessing the agents and planning subsequent actions of the vehicle itself. Human decision-making can be very abstract and thus difficult to integrate within learned models. For example, aspects of human decision-making, such as preferences, intent, latency, and so on, are not generally considered by the implemented models. Therefore, results of the models may not consider all of the possible aspects that influence the outcome, thereby leading to predictions that may not be as accurate as possible.

SUMMARY

Example systems and methods relate to integrating human decision-making into a model-based system using a latent representation. As noted previously, integrating aspects of human decision-making into a model-based system are complex and, therefore, legacy systems may not generate optimal inferences due to not fully considering all aspects of a situation, especially in relation to considerations of how a driver makes decisions.

Therefore, in at least one arrangement, a cognitive system is disclosed that implements a network architecture for providing shared control of a vehicle where the network architecture integrates multiple different factors to consider aspects of human decision-making. For example, the network architecture may include a world encoder that functions to process data inputs in the form of various sensor data. The sensor data can include different combinations of information but is generally collected to capture a comprehensive perspective of the world, including the driver, the vehicle, and the surrounding environment. Thus, the world encoder functions to encode the sensor data into features that are a latent representation within a defined latent space. The latent representation is then used by various decoder networks of the network architecture to derive different information.

In at least one aspect, the network architecture uses various models to determine different aspects of human decision-making for the driver. In various approaches, the cognitive system determines the latency with which a driver makes decisions, the intent of a driver, preferences of a driver, and so on. The network architecture may implement different types of models to determine the different aspects of the human decision-making process, such as nonlinear opinion dynamics (NOD), drift-diffusion models (DDMs), semi-Markov models, hidden Markov models, and so on. These inferences about decision making of the driver can be fed into a policy model that, for example, also receives the latent representation and then outputs a signal for shared control of the vehicle that provides for jointly making discrete decisions about driving actions, such as overtaking, merging, intersection negotiation, and so on.

Furthermore, to achieve understanding about human decision-making in controlling the vehicle, the cognitive system trains the models using various approaches. For example, in one aspect, the system trains a reward model to predict rewards for the policy model. In further aspects, the system uses supervised learning approaches to train decision models on the human decision-making from observations of latent states, which may be captured via interviews of drivers, and so on. In this way, the system improves the way in which the vehicle is able to coordinate control with the driver through consideration of how the driver makes decisions.

In one embodiment, a cognitive system is disclosed. The cognitive system includes one or more processors and a memory communicably coupled to the one or more processors. The memory stores instructions that, when executed by the one or more processors, cause the one or more processors to acquire sensor data, including driver data about a driver of a vehicle and driving data about the vehicle and a surrounding environment of the vehicle. The instructions include instructions to encode, using a world encoder, the sensor data into a latent representation. The instructions include instructions to determine human decision-making characteristics according to the latent representation. The instructions include instructions to generate a control signal for providing shared control of the vehicle according to the human decision-making characteristics and the latent representation.

In one embodiment, a non-transitory computer-readable medium including instructions that, when executed by one or more processors, cause the one or more processors to perform various functions is disclosed. The instructions include instructions to acquire sensor data, including driver data about a driver of a vehicle and driving data about the vehicle and a surrounding environment of the vehicle. The instructions include instructions to encode, using a world encoder, the sensor data into a latent representation. The instructions include instructions to determine human decision-making characteristics according to the latent representation. The instructions include instructions to generate a control signal for providing shared control of the vehicle according to the human decision-making characteristics and the latent representation.

In one embodiment, a method is disclosed. In one embodiment, the method includes acquiring sensor data, including driver data about a driver of a vehicle and driving data about the vehicle and a surrounding environment of the vehicle. The method includes encoding, using a world encoder, the sensor data into a latent representation. The method includes determining human decision-making characteristics according to the latent representation. The method includes generating a control signal for providing shared control of the vehicle according to the human decision-making characteristics and the latent representation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with integrating human decision-making into a model-based system using a latent representation are disclosed. As noted previously, integrating aspects of human decision-making into a model-based system are complex and, therefore, legacy systems may not generate optimal inferences due to not fully considering all aspects of a situation, especially in relation to considerations of how a driver makes decisions.

Therefore, in at least one arrangement, a cognitive system is disclosed that implements a network architecture for providing shared control of a vehicle where the network architecture integrates multiple different factors to consider aspects of human decision-making. For example, the network architecture may include a world encoder that functions to process data inputs in the form of various sensor data. The sensor data can include different combinations of information but is generally collected to capture a comprehensive perspective of the world, including the driver, the vehicle, and the surrounding environment. Thus, the world encoder functions to encode the sensor data into features that are a latent representation within a defined latent space. The latent representation is then used by various decoder networks of the network architecture to derive different information.

In at least one aspect, the network architecture uses various models to determine different aspects of human decision-making for the driver. In various approaches, the cognitive system determines the latency with which a driver makes decisions, the intent of a driver, preferences of a driver, and so on. The network architecture may implement different types of models to determine the different aspects of the human decision-making process, such as nonlinear opinion dynamics (NOD), drift-diffusion models (DDMs), semi-Markov models, hidden Markov models, and so on. These inferences about decision-making of the driver can be fed into a policy model that, for example, also receives the latent representation and then outputs a signal for shared control of the vehicle that provides for jointly making discrete decisions about driving actions, such as overtaking, merging, intersection negotiation, and so on.

Furthermore, to achieve understanding about human decision-making for controlling the vehicle, the cognitive system trains the models using various approaches. For example, in one aspect, the system trains a reward model to predict rewards for the policy model. In further aspects, the system uses supervised learning approaches to train decision models on the human decision-making from observations of latent states, which may be captured via interviews of drivers, and so on. In this way, the system improves the way in which the vehicle is able to coordinate control with the driver through consideration of how the driver makes decisions.

Figure 1:
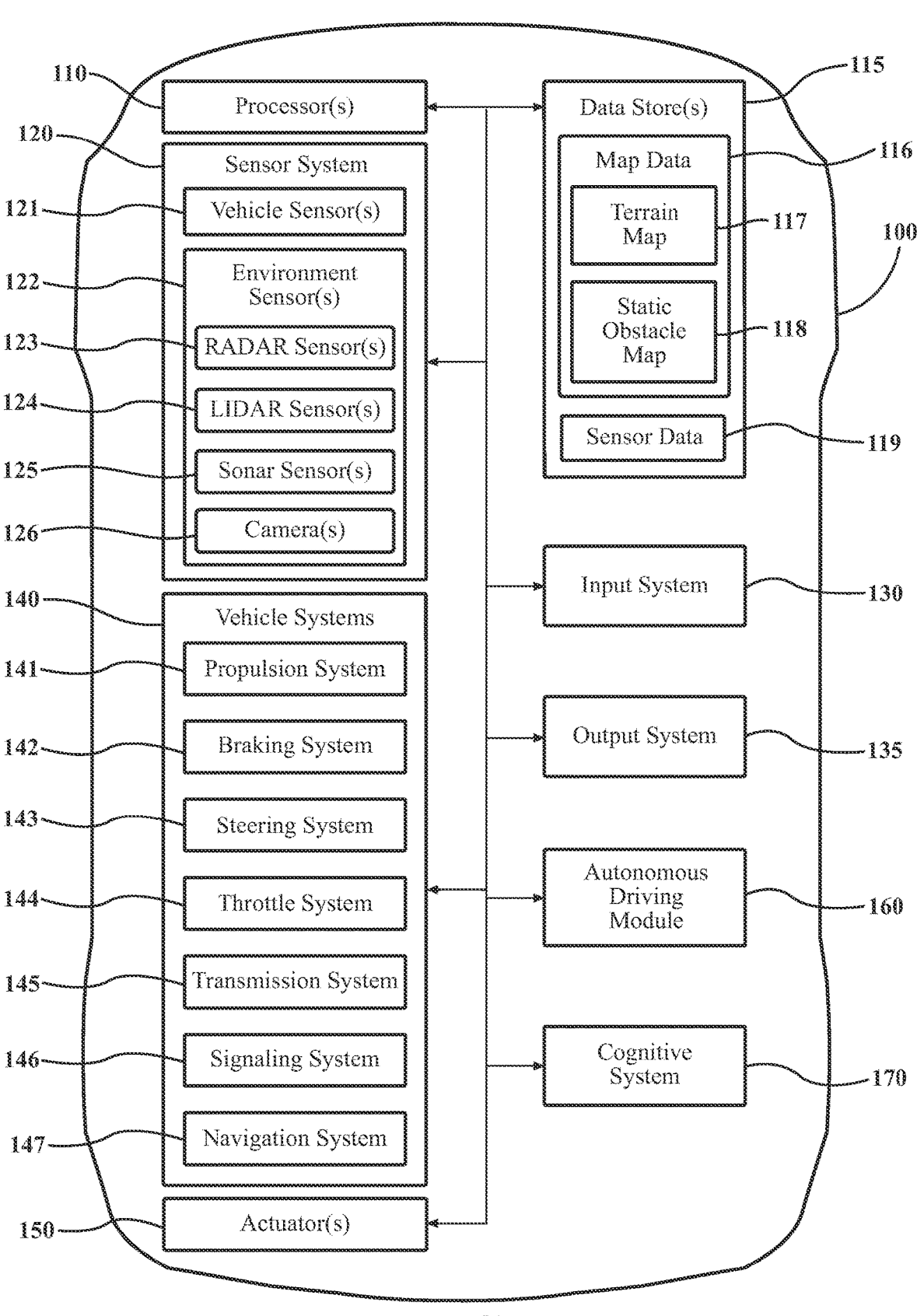
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be another electronic device (e.g., robot, static roadside unit (RSU), etc.) that, for example, benefits from the functionality discussed herein.

In any case, the vehicle 100 also includes various elements. It will be understood that, in various embodiments, it may not be necessary for the vehicle 100 to have all of the elements shown in FIG. 1. The vehicle 100 can have a different combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a cognitive system 170 that functions to train and implement a network architecture to integrate human decision-making within processes for providing shared control of the vehicle 100. While depicted as a standalone component, in one or more embodiments, the cognitive system 170 is integrated with other systems, such as the automated driving module 160, or another component of the vehicle 100. The noted functions and methods will become more apparent with a further discussion of the figures.

Figure 2:
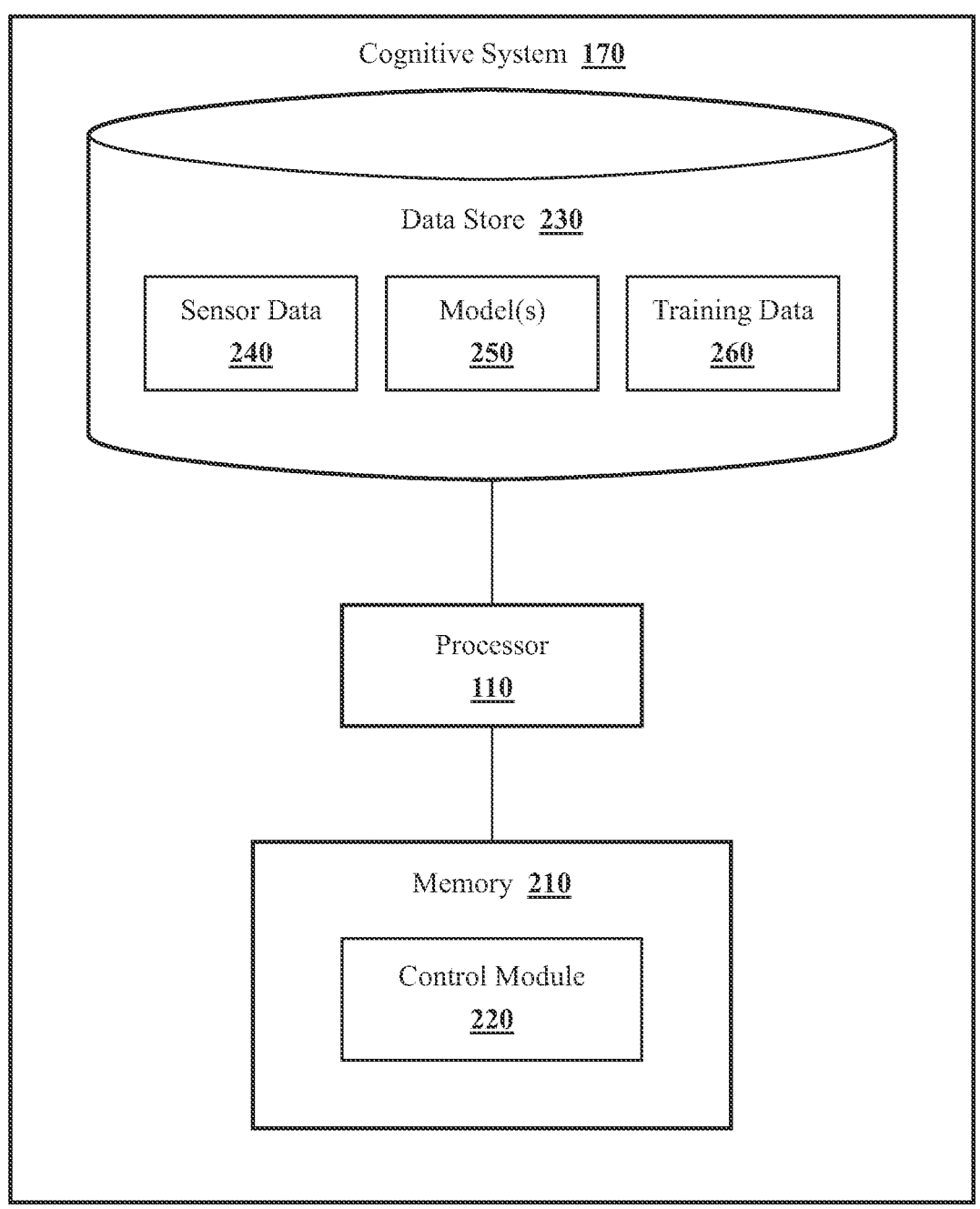
FIG. 2 illustrates one embodiment of a cognitive system that is associated with integrating human decision-making into a system for shared control of a vehicle.

With reference to FIG. 2, one embodiment of the cognitive system 170 is further illustrated. The cognitive system 170 is shown as including a processor 110. Accordingly, the processor 110 may be a part of the cognitive system 170 or the cognitive system 170 may access the processor 110 through a data bus or another communication path. In one or more embodiments, the processor 110 is an application-specific integrated circuit (ASIC) that is configured to implement functions associated with a control module 220. In general, the processor 110 is an electronic processor, such as a microprocessor, that is capable of performing various functions, as described herein. In one embodiment, the cognitive system 170 includes a memory 210 that stores the control module 220. The memory 210 is a random-access memory (RAM), read-only memory (ROM), a hard disk drive, a flash memory, or other suitable memory for storing the control module 220. The control module 220 is, for example, computer-readable instructions that, when executed by the processor 110, cause the processor 110 to perform the various functions disclosed herein.

Furthermore, in one embodiment, the cognitive system 170 includes a data store 230. The data store 230 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 includes sensor data 240, a model 250, which may include multiple separate sub-models for performing different tasks, and training data 260 along with, for example, other information that is used by the control module 220. The training data 260 can include annotated data for supervised learning, driving snippets and observations for human-in-the-loop reinforcement training, metrics for defining reward functions, and so on. Further details of the training will be described with subsequent figures.

With reference to the sensor data 240, the sensor data 240 can include a wide array of different information depending on the implementation. In various approaches, the sensor data 240 can include internal observations of the vehicle 100, observations of the vehicle 100 itself, and external observations of the vehicle 100. In general, the system 170 acquires the sensor data 240 to derive a current context that may characterize an emotion of the occupant, a physiological response of the occupant, a behavior of the vehicle, characteristics of the surrounding environment of the vehicle 100, or other information that is useful in determining aspects about human decision-making and how to control the vehicle 100 within the current contextual environment.

Accordingly, the control module 220 generally includes instructions that function to control the processor 110 to retrieve data from sensors of a sensor system 120 of the vehicle 100. In other words, the control module 220 includes instructions to acquire driver state information that characterizes a latent state of the driver, which may be represented via a present mental state of the driver, including emotions, present actions of the driver, where a gaze of the driver may be directed, autonomic responses of the driver, physiological responses/conditions of the driver, and so on. It should be appreciated that the present disclosure provides an exemplary listing of aspects associated with the driver that can be monitored to produce the driver state information; however, this listing is not to be construed as limiting and is provided as an exemplary list of possibilities for purposes of this discussion.

Accordingly, by way of example, the driver state information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the driver in the vehicle 100 (e.g., forward-facing, rear-facing, etc.), seat position, rate of movement, facial feature movements (e.g., mouth, blinking eyes, moving head, expressions, etc.), and so on.

Additionally, the control module 220 can determine the driver state information in multiple different ways depending on a particular implementation. In one embodiment, the control module 220 communicates with various sensors of the sensor system 120, including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the driver and/or aspects related to the driver. Furthermore, the sensor system 120 can include multiple redundant ones of the sensors in order to, for example, improve the accuracy/precision of collected driver state information. In this way, the system 170 can determine aspects of the current context relating to the driver of the vehicle 100.

Of course, as previously noted, the cognitive system 170, in different configurations, also considers other aspects, such as the current and past behaviors of the vehicle 100, operating characteristics of the vehicle 100, and the characteristics of the external environment. Accordingly, the control module 220 generally includes instructions that function to control the processor 110 to receive data inputs from a set of sensors that include information about these separate aspects. In one embodiment, the set of sensors include, for example, sensors of the vehicle 100 (e.g., sensor system 120), sensors in communication with the vehicle 100 over a communication link (e.g., infrastructure-based and/or vehicle-based sensors), and so on.

Accordingly, the control module 220 generally includes instructions that cause the processor 110 to control one or more sensors of the vehicle 100 to generate an observation about the surrounding environment. Broadly, an observation, as acquired by the control module 220, is information about current surroundings, including objects present therein and conditions of the environment overall as perceived by at least one sensor. Thus, the observation is generally a group of one or more data that are processed into a meaningful form.

The control module 220, in one embodiment, controls respective sensors of the vehicle 100 to provide the data inputs in the form of the sensor data 240. The control module 220 may further process the sensor data 240 into separate observations of the driver, the vehicle 100, and the surrounding environment. For example, the control module 220, in one approach, fuses data from separate sensors to provide an observation about a particular aspect of the surrounding environment. By way of example, the sensor data 240 itself, in one or more approaches, may take the form of separate images, radar returns, LiDAR returns, and so on. The control module 220 may derive determinations (e.g., location, trajectory, etc.) from the sensor data 240 and fuse the data for separately identified aspects of the surrounding environment, such as surrounding vehicles. The control module 220 may further extrapolate the sensor data 240 into an observation by, for example, correlating the separate instances of sensor data into a meaningful observation about the object beyond an instantaneous data point. For example, the control module 220 may track a surrounding vehicle over many data points to provide a trajectory.

Additionally, while the control module 220 is discussed as controlling the various sensors to provide the sensor data 240, in one or more embodiments, the module 220 can employ other techniques that are either active or passive to acquire the sensor data 240. For example, the control module 220 may passively sniff the sensor data 240 from a stream of electronic information provided by the various sensors or other modules/systems in the vehicle 100 to further components within the vehicle 100. Moreover, as noted, the control module 220 can undertake various approaches to fuse data from multiple sensors when providing the sensor data 240. Thus, the sensor data 240, in one embodiment, represents a combination of perceptions acquired from multiple sensors.

Of course, depending on the sensors that the vehicle 100 includes, the available sensor data 240 that the system 170 can harvest may vary. As one example, according to a particular implementation, the vehicle 100 may include different types of cameras or placements of multiple cameras. In an additional aspect, the control module 220 may acquire aspects relating to a state of the vehicle 100 and/or observations from nearby entities that communicate via a cloud environment. For example, the sensor data 240 may further include IMU data from the vehicle 100, a GPS location of the vehicle, a current speed of the vehicle 100, and so on. Moreover, the observations that the control module 220 acquires may include trajectory and position information about nearby dynamic objects.

With continued reference to FIG. 2, the model 250 is illustrated as a discrete model that is, for example, a machine learning algorithm. However, in various approaches, the model 250 is representative of a broader network architecture that is comprised of multiple separate models that perform different tasks related to inferring aspects about the driver and the surrounding environment when determining how to control the vehicle 100. As will be described in greater detail subsequently, the model 250 is generally responsible for encoding the sensor data 240 into a latent representation defined with a latent space. The latent representation encodes a latent state of the driver and of the surrounding environment so that various further models (e.g., a policy model, decision models, reward model, etc.) can provide different inferences used in determining how to integrate automated controls with driver provided controls within a shared control environment of the vehicle 100.

In one form, the architecture of the model 250 is a variational autoencoder (VAE); however, it should be appreciated that the architecture may integrate multiple additional components beyond a basic VAE. For example, the form of the sub-models may have different types of architectures depending on the implementation. In one approach, one or more of the models may be a language model, which may be a large language model (e.g., generative pretrained transformer (GPT) network). In further approaches, the sub-models may include a recurrent neural network (RNN), such as a long short-term memory (LSTM) model. In general, the system 170 trains the model 250, or the models that comprise the model 250, to learn latent space of relevant parts of the trajectory of the vehicle, processed perceptions, images, and other input information that form salient features. In general, the training guides the formation of the latent space to provide structure thereto so that latent states of the decision-making of the driver are captured in relation to the salient features of the environment, trajectory, and so on.

Training the model 250 may also take different forms, such as supervised learning and/or reinforcement learning. In one arrangement, the control module 220 trains the model 250 according to reinforcement learning where the control module 220 defines a metric that is applied as a reward function. That is, control module 220 may define the metric in relation to behaviors of the driver and/or the vehicle, such as an offset from an optimal driving line, which may include a speed profile, control input timing (e.g., braking, steering, accelerating, etc.), and a distance from an optimal position. In further examples, the metric includes assessing aspects related to safety, such as distances to vehicles/obstacles, collisions, speeds relative to limits, etc. It should be noted that the training may occur as an online process or an offline process that uses driving data. Thus, the model 250 itself may initially be pretrained, partially trained, or untrained.

Of course, while reinforcement learning that uses a specific metric is described, the control module 220 may also implement other forms of training, such as a reward model trained to predict the reward, supervised training, etc. In one approach, the control module 220 acquires labeled information for different aspects of the human decision-making and/or other aspects. In other words, a labeler reviews prior driving data, which may be the driver or another labeler, within the context of different driving scenarios and provides an indication of, for example, different decision-making considerations that correspond to the driving data. In general, the labels correspond with inferences of the separate models that are provided as outputs. In the case of the reward model, the training data can include explicit labels about whether an action or current state of the vehicle 100 is appropriate or not. Thus, the training data 260 may take different forms depending on the model that is being trained.

Figure 3:
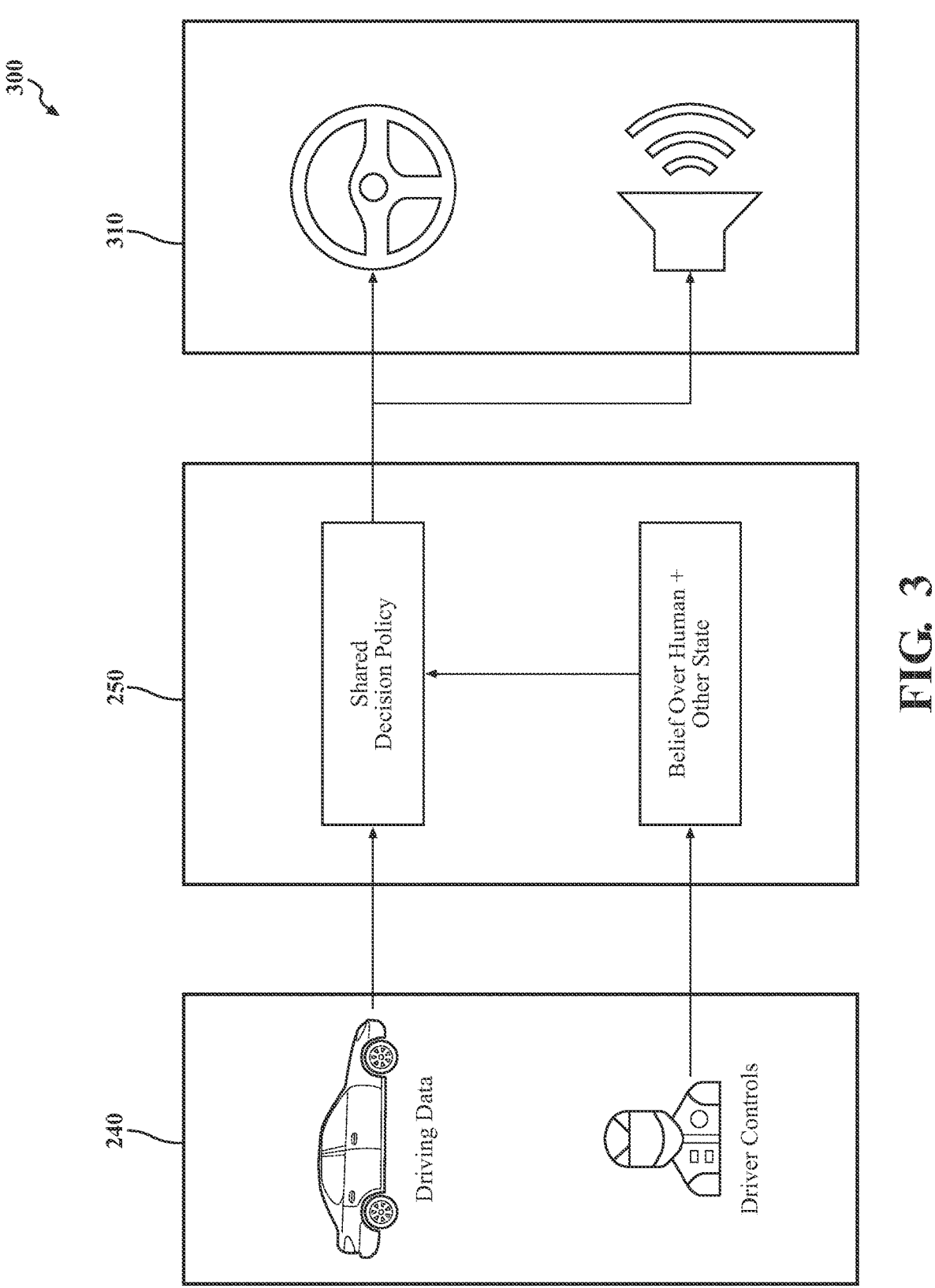
FIG. 3 illustrates a block diagram of a general flow of the cognitive system.

With reference to FIG. 3, a block diagram 300 is shown of a general flow of the cognitive system 170. As shown in FIG. 3, the sensor data 240 includes observations of the driving data (e.g., vehicle trajectory) and driving controls provided by the driver. This information is fed into the model 250, which functions to generate a latent representation of the sensor data 240 using a world encoder. Thereafter, different sub-models of the model 250 generate determinations about human decision-making, which are beliefs over the human state and other states, that are provided into the policy model to provide shared control decisions. Thus, the model 250 generates outputs 310, in one arrangement, a planner representation that is implemented by the vehicle 100 to control the vehicle 100 according to some combination of inputs, which may be on a sliding scale of disregarding the human inputs to blending the inputs with automated controls to full human inputs. It should be appreciated that the outputs 310 can include controls for the vehicle 100 along with other outputs, including various secondary controls of the vehicle 100 (e.g., lights, signals, etc.), alerts to the driver, and so on, which may be generated in a way that is preferred by the driver.

Figure 4:
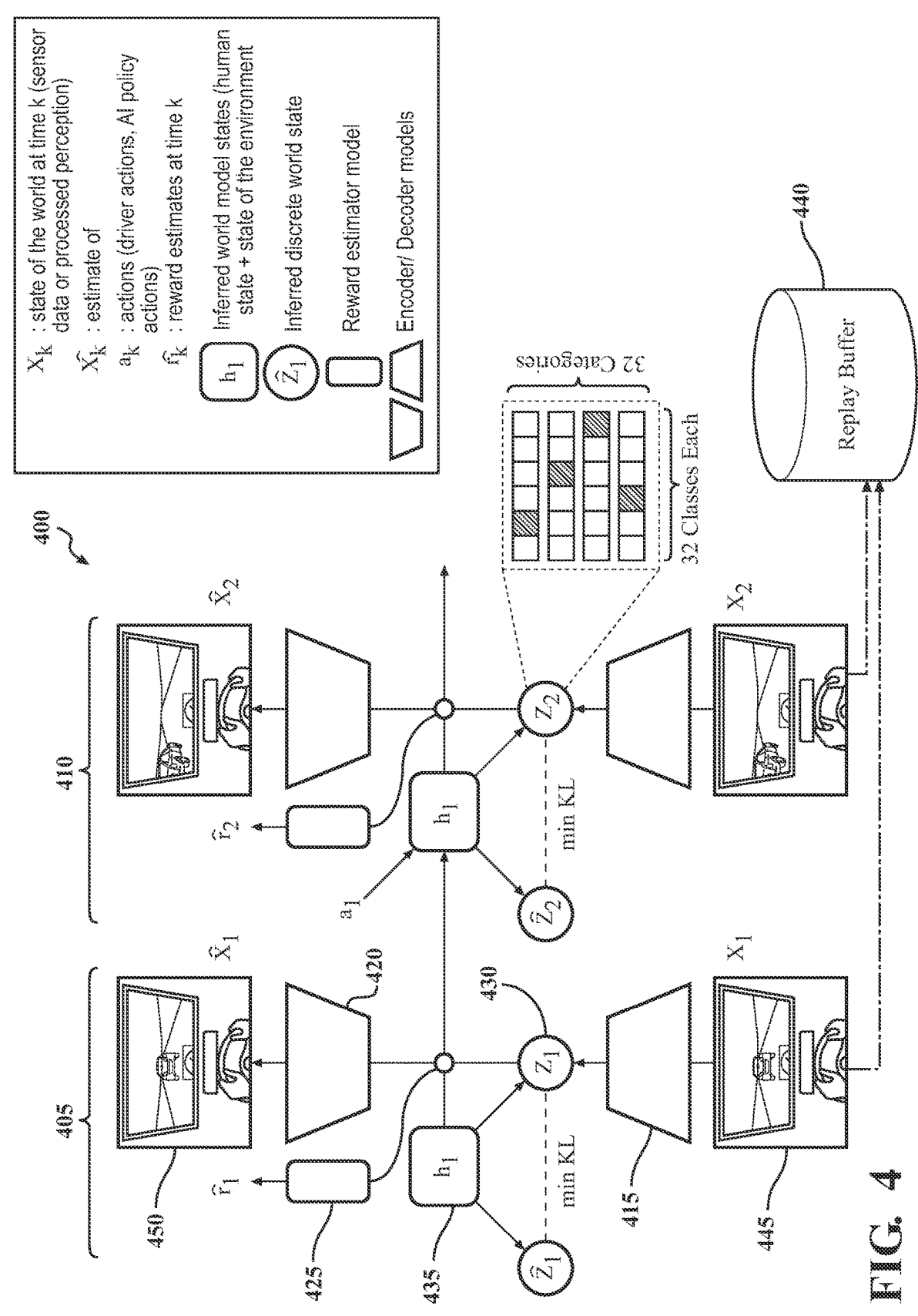
FIG. 4 illustrates a diagram of a model at two different time steps.

As further explanation of the network architecture of the model 250 and training of the model 250, consider FIG. 4. FIG. 4 illustrates a diagram 400 of the model 250 at two different time steps 405 and 410. The model 250 itself is shown as being comprised of a world encoder 415, a decoder 420, a reward model 425, and various inferred states 430 and 435 that are part of a latent representation within a latent space. In particular, the diagram 400 shows an approach to training the model 250 in which driving data (e.g., information about an environment depicting a scenario) from a replay buffer 440 is used to simulate a driving environment and a driver controls the simulated vehicle. In any case, a simulation 445 is shown from which sensor data 240 is derived and fed into the decoder 420. It should be noted that during inference, the sensor data 240 is input from various vehicle systems (e.g., sensor system 120) either in a raw or processed/fused form. The decoder 420 generates a latent representation of the sensor data 240 represented as latent states 430 and 435, which separately correspond to world states and human states. This information can then be used to predict subsequent latent states via a dynamics model at a subsequent time step. In any case, the reward model 425 is trained to predict a reward at each time step for training the encoder 415 and the decoder 420 via a learned form of reinforcement learning. The decoder 420, which may also include a policy model for determining how to generate shared controls, accepts the latent representation of the world state and the human state and infers the original world state for purposes of training. Thus, the original sensor data 240 may function as a further supervised signal in this training example.

Figure 5:
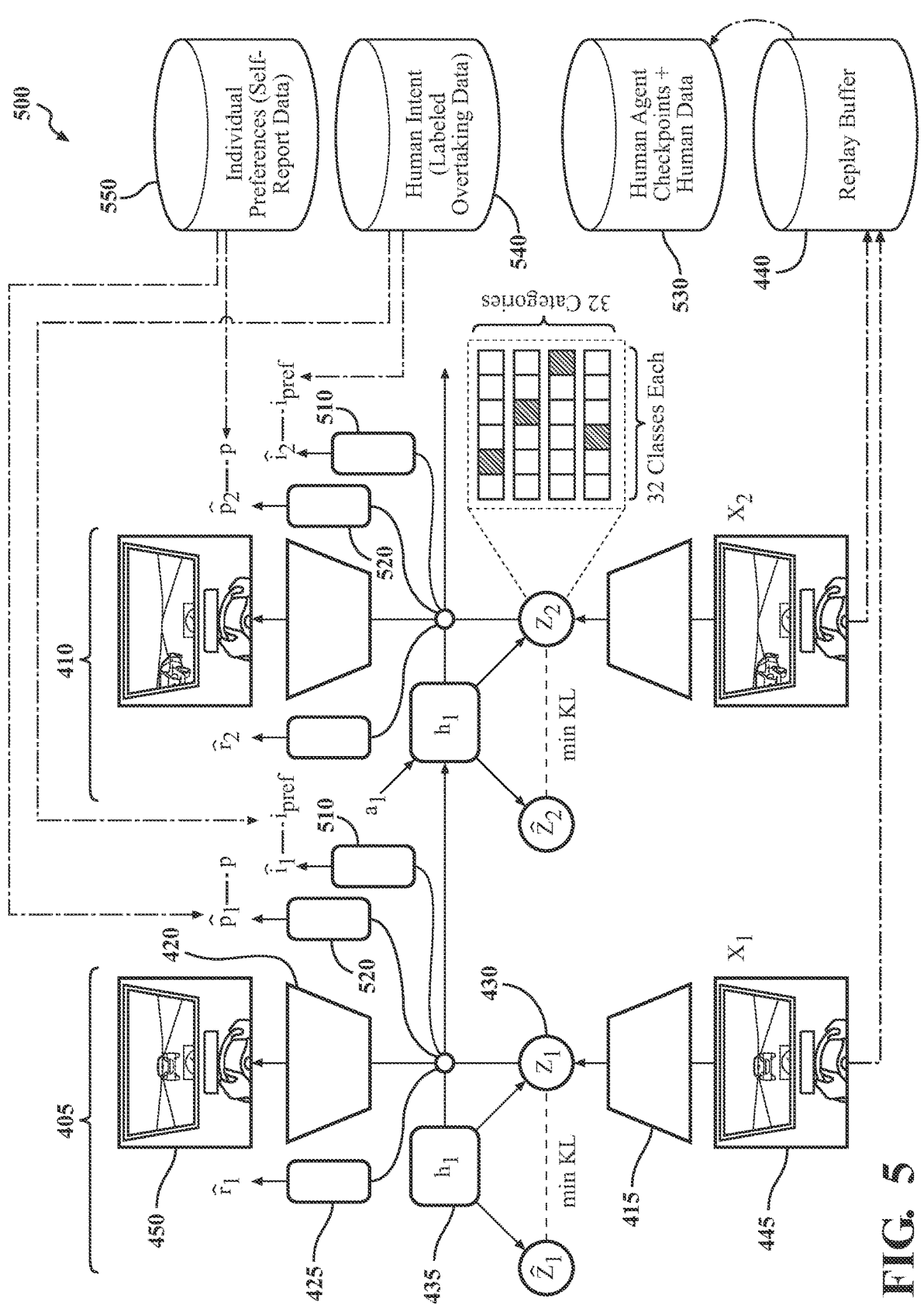
FIG. 5 illustrates a diagram including sub-models for integrating human decision-making.

While the training example shows a simulation and re-generating the original input data, it should be appreciated that during inference, the sensor data 240 that are provided as input are real-time data acquisitions from the vehicle 100, and the policy model, which is integrated with the decoder 420 as illustrated, generates a planner representation that is used by various systems of the vehicle 100 (e.g., automated driving module 160) for generating shared controls of the vehicle 100. Turning to FIG. 5, a diagram 500, which is similar to the diagram 400 of FIG. 4, is shown but with the addition of further sub-models 510 and 520 for inferring aspects of human decision-making. The diagram 500 further illustrates aspects of supervised training of the model 250. For example, additional information about human intent 530 is included that facilitates training the world encoder 415 to encode latent human states into the latent representation. Additionally, human intent data 540 and individual preferences data 550 are further shown. The data 540 and 550 function as annotations for training the models 510 and 520 on inferring driver intent and driver preferences, respectively. By way of example, the individual preference data 550 can be information that is self-reported by a driver during driving or as an annotation after driving to review a driving session. The human intent data 540 is data that corresponds with realized intent. For example, when a scenario associated with overtaking is identified, the data can be labeled as to whether the driver actually performed an overtaking maneuver or not, which then encodes the driver's intent. As such, the labeled data can then be used to train the model 510. The outputs of the models 510 and 520 are further inputs into the policy model (not explicitly illustrated) in order to provide further inferences about latent states of the driver's decision-making so that the policy model can provide consideration to these aspects in the output. In this way, the model 250 can learn how to encode the preferences and intent of the driver within the planner representations that are provided as outputs for shared control of the vehicle 100.

Figure 6:
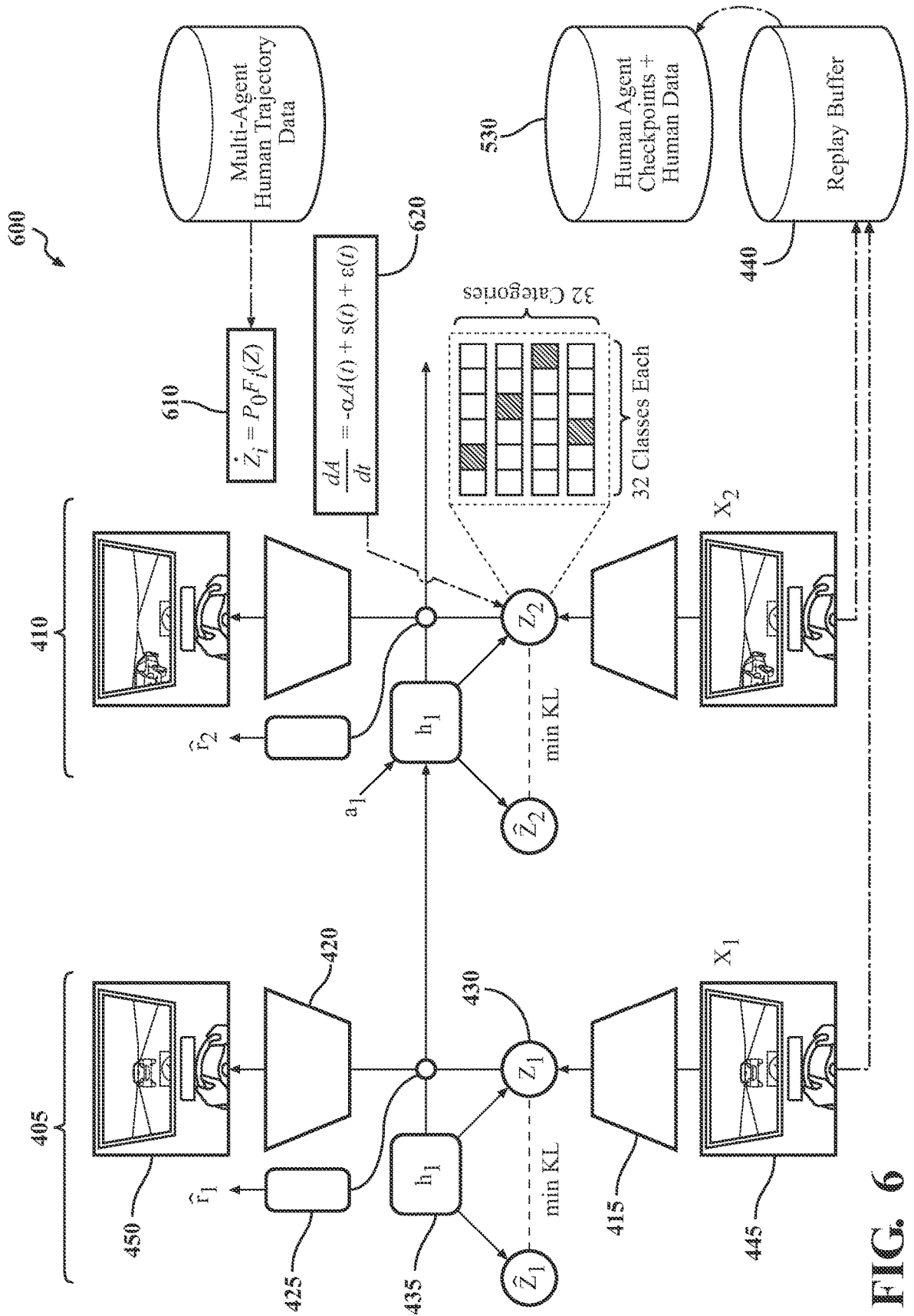
FIG. 6 illustrates a diagram illustrating the integration of nonlinear opinion dynamics (NOD) and drift-diffusion models (DDMs).

Moving to FIG. 6, a diagram 600, which is similar to diagrams 400 and 500 of FIGS. 4-5, is shown. The diagram 600 illustrates a process for capturing human decision-making and latency within the provided outputs of the model 250. In particular, the diagram 600 illustrates the integration of nonlinear opinion dynamics (NOD) 610 and drift-diffusion modeling 620 into the model 250. As an initial note, the diagram 600 generally shows a training arrangement of model 250; however, the NOD 610 and the drift-diffusion modeling 620 may also be integrated during inference. In general, the nonlinear opinion dynamics (NOD) 610 are shown as a way to integrate greater sensitivity to human decision-making (i.e., decision vs indecision) through consideration of dynamic states inferred by the dynamics model. Thus, the use of NOD informs the model 250 about what the human is doing and the limitations of the human. This permits the model 250 to consider how to adapt or whether to adapt/augment controls of the vehicle 100 according to the decision-making or lack thereof of the driver. In general, the use of the NOD 610 further facilitates consideration of the evolution of human decision-making as a time-dependent parameter and instead of a discrete instantaneous determination since humans consider what they know from the past and project decisions into the future. Separately, the drift-diffusion model 620 captures delay from response to stimuli in the driver when making decisions. As one example, when a driver is considering whether or not to overtake another vehicle, the drift-diffusion model 620 captures any delay in the driver's decision-making for this determination. In this way, the system 170 implements the model 250 to provide improved outputs for shared control by using multiple separate mechanisms to better model human decision-making.

Figure 7:
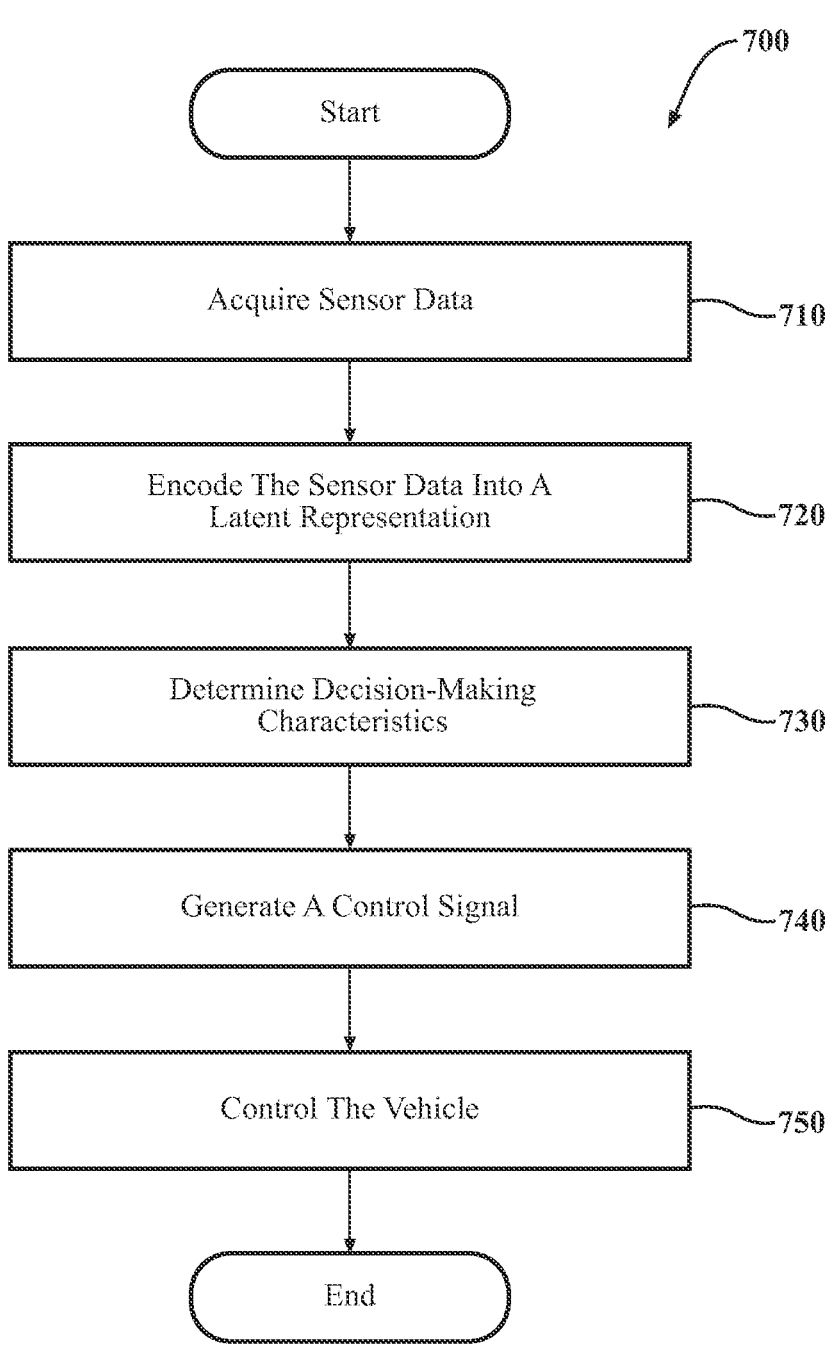
FIG. 7 is a flowchart illustrating one embodiment of a method that is associated with integrating human decision-making for determining how to apply shared control of a vehicle.

FIG. 7 illustrates a flowchart of a method 700 that is associated with integrating human decision-making into a model-based system. Method 700 will be discussed from the perspective of the cognitive system 170. While method 700 is discussed in combination with the cognitive system 170, it should be appreciated that the method 700 is not limited to being implemented within the cognitive system 170 but is instead one example of a system that may implement the method 700.

At 710, the control module 220 acquires the sensor data 240 including driver data about a driver of a vehicle and driving data about the vehicle and a surrounding environment of the vehicle. In general, the sensor data 240 defines a current context associated with the driver, the vehicle 100, and the surrounding environment of the vehicle 100. As previously outlined, the control module 220 acquires the sensor data 240 using sensors available from the vehicle 100 and/or external sensors from other devices, which may communicate with the cognitive system 170 via vehicle-to-vehicle (V2V), vehicle-to-infrastructure (V2I), or other available communication standards. The content of the sensor data 240 may vary by implementation, but the control module 220 collects the sensor data 240 to characterize the current context, which includes current operational aspects of the vehicle 100 (e.g., trajectory, etc.), a mental state of the driver, and the surrounding environment (e.g., obstacles). The current context may define aspects relating to the current mental/emotional state of the driver so that the system 170 can encode a latent state of the driver and consider aspects of the driver's decision-making when determining how to control the vehicle 100. Thus, as may be expected, many different data points may directly or indirectly contribute to understanding the current context.

Accordingly, the sensor data 240 may include information about past driving behaviors of the vehicle 100 (e.g., a prior 10 s or more of trajectory data). In further arrangements, the sensor data 240 includes explicit observations of the driver, such as camera/video images, and other data as outlined previously. The information about the driver may also include explicit knowledge of driver preferences, including explicit instructions from the occupant. Further information can include information about the vehicle 100 itself, such as vehicle performance (e.g., steering angle, accelerator inputs, etc.), trajectory information, dynamics data, telematics data, and so on. Moreover, the sensor data 240 may also include external observations about nearby objects, weather, vehicle location (e.g., highway, rural, urban, etc.). In any case, the sensor data 240 may vary but can include external observations of the vehicle 100 (e.g., the surrounding environment), internal observations, and information about the vehicle 100 itself.

At 720, the control module 220 encodes, using a world encoder, the sensor data 240 into a latent representation. The latent representation is an encoded abstraction of the sensor data 240 that is defined relative to a latent space of the model 250. Thus, the latent representation encodes aspects of the sensor data 240, including a latent state of the driver, thereby integrating human decision-making within the latent representation in addition to aspects of the vehicle 100 and surrounding environment from which determinations about control are possible. As a general note about the latent space and the latent representation of the sensor data 240, the training of the model 250, and, in particular, the world encoder, functions to define the latent space such that that the latent space integrates the encoding of aspects of human decision-making along with features of the vehicle 100 (e.g., vehicle trajectory) and the surrounding environment (e.g., locations of objects, arrangements of scenes, etc.).

At 730, the control module 220 determines human decision-making characteristics according to the latent representation. In at least one configuration, the control module 220 applies one or more decision models (i.e., sub-models of the model 250) to generate outputs indicating intent of the driver, preferences for decisions, preferences for a mode of interaction, latency in making decisions, and human decision-making limitations (e.g., decision vs. indecision) according to the latent representation. That is, the model 250, in at least one approach, includes various sub-models that function to process the latent representation encoded at 720 to derive inferences about how the driver is making decisions. As shown in FIGS. 5-6, the sub-models can be varied and are generally trained on a particular aspect of human decision-making. As noted previously, the system 170 can implement an architecture of the model 250 to include nonlinear opinion dynamics (NOD). The model 250 generally uses NOD to infer what the driver is considering and limitations of the driver in relation to the human decision-making. In relation to the NOD, the model 250 may further include a dynamics model that infers a subsequent representation of the latent representation at a subsequent time step to further account for future considerations of the driver, which can be integrated in a time-dependent manner.

In a further aspect, the control module 220 also implements drift-diffusion modeling to account for latencies of a driver in making the decision. That is, the control module 220 uses drift-diffusion modeling in relation to the latent representation to consider the latency of the driver in making a particular decision. As noted previously, if a driver is unsure about an overtaking maneuver and, thus, takes longer to perform an action, the model 250 captures this latency using drift-diffusion modeling. Moreover, the other noted considerations of intent of the driver, preferences for decisions, preferences for a mode of interaction, and so on are, in at least one arrangement, implemented by additional sub-models, as shown in FIG. 5, that also process the latent representation to generate the determinations about respective aspects of human decision-making.

At 740, the control module 220 generates a control signal for providing shared control of the vehicle 100 according to the human decision-making characteristics and the latent representation. In at least one approach, the control module 220 uses the policy model to process the latent representation along with the intermediate determinations by the other models, as described at 730, to generate a control signal. The policy model is informed about the driver and how the driver makes decisions via the inputs while further acquiring encoded features from the latent representation about the vehicle 100 and the surrounding environment. From this information, the policy model is able to determine how to blend driver control inputs (e.g., steering, braking, acceleration) with automated control inputs (e.g., vehicle controls provided by the automated driving module 160). The policy model, in at least one arrangement, outputs the determination in the form of a planner representation, which outlines a feasible path for controlling the vehicle over a defined horizon (e.g., 2-5 s).

At 750, the control module 220 controls the vehicle 100. In one embodiment, the planner representation that was previously generated is communicated to one or more components within the vehicle 100 to control the vehicle 100. The planner representation generally embodies a blending of control inputs provided by the driver and control inputs provided by the vehicle 100 itself via automated systems (e.g., the automated driving module 160). Thus, the policy model has previously considered the available corpus of information and distilled the information into an actionable plan for controlling the vehicle 100 that considers how to best integrate the two sets of controls to safely control the vehicle 100. The control module 220 may communicate the planner representation to the automated driving module 160 or another component within the vehicle 100 that functions to dynamically control operation of the vehicle 100 via steering, braking, and acceleration.

Figure 8:
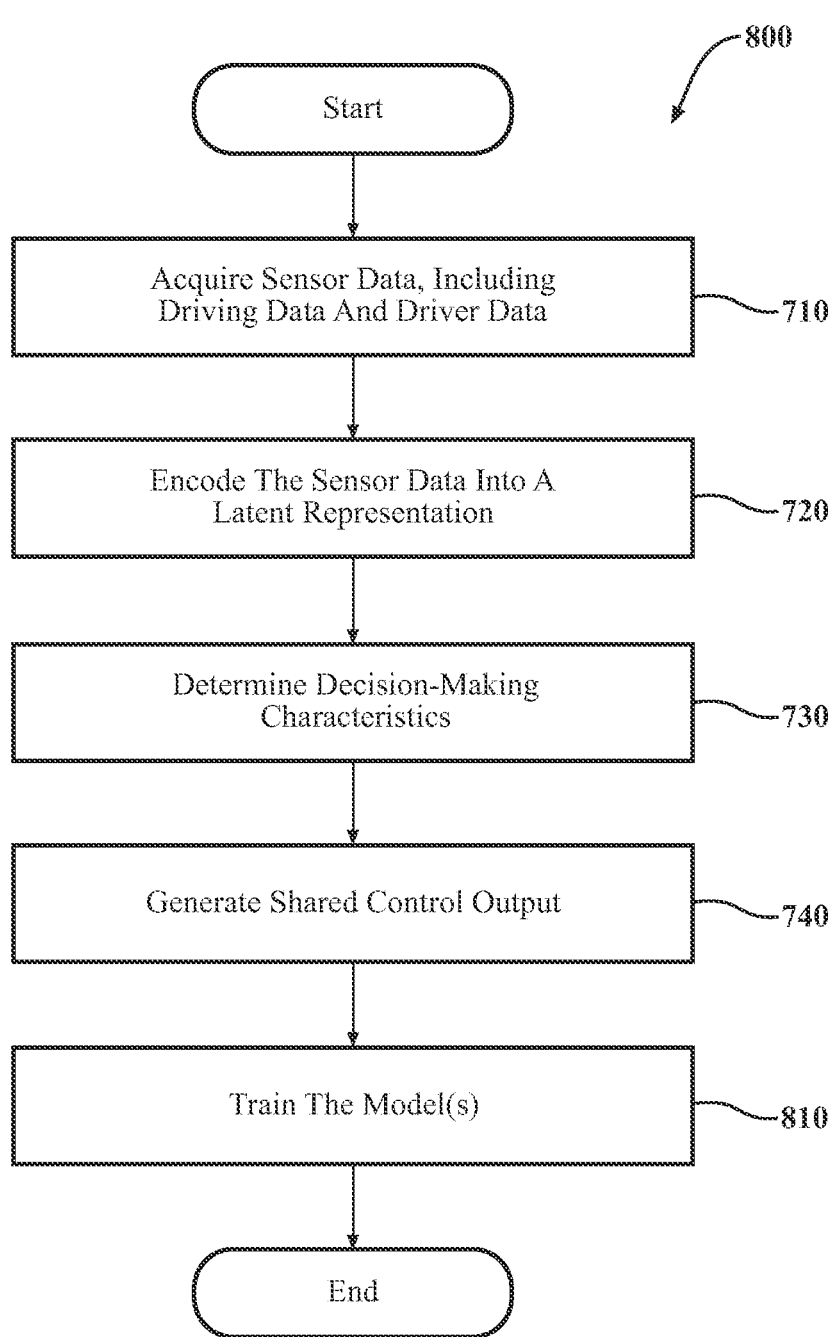
FIG. 8 is a flowchart illustrating one embodiment of a method for training the disclosed model.

FIG. 8 illustrates a flowchart of a method 800 that is associated with training a model-based system to integrate human decision-making. Method 800 will be discussed from the perspective of the cognitive system 170. While method 800 is discussed in combination with the cognitive system 170, it should be appreciated that the method 800 is not limited to being implemented within the cognitive system 170 but is instead one example of a system that may implement the method 800. In general, the process of training the model 250 is similar to the process of inference, as described along with the method 700 except training can involve the use of additional elements, such as additional sub-models, functions, etc. that act to determine a loss, a reward, or another value that is used to adjust the model 250.

Accordingly, in at least one arrangement, the control module 220 acquires driving replay information (e.g., replay buffer 440) that is information previously collected by a vehicle upon driving a route or synthetic data that depicts a scenario in which the vehicle is being controlled on a roadway. In any case, the replay information, which mimics the sensor data 240 that would be acquired by the vehicle 100 during normal operation and inference, is fed into the world encoder. As described previously in relation to method 700, the world encoder encodes the replay information into a latent representation. The latent representation is then fed into the various sub-models to generate the outputs about human decision-making and a shared control policy. For example, the latent representation is provided into a decision model, which may include multiple separate models, a policy model, and a reward model. The models then produce outputs that provide for shared control of the vehicle. In a further aspect, the latent representation is also provided to a decoder that attempts to recreate the original input. The recreated version of the relay information can then be used to further train the world encoder.

At 810, the control module 220 trains the model 250. In one arrangement, the control module 220 trains at least the world encoder and a policy model using a reward network. The reward network is an additional model that predicts rewards according to the latent representation. Thus, initially, the reward network is itself trained using labeled data, i.e., annotations within the replay information. Thereafter, the reward network trains the policy model and the world encoder through the inference of rewards.

Other aspects of the model 250 may be trained using training data 260 that includes additional labeled data for supervised training. For example, the decision models that perform inference regarding human decision-making are trained using various forms of labeled data that correspond to the particular task of the network. The labeled data can include individual preferences that may be labeled according to self-reporting of a driver. Other labeled data for training can include human intent data, which can include labeled actions of a driver, such as overtaking, merging, etc. Other elements of the training data 260 include multi-agent human trajectory data, and other labeled information associated with aspects of human decision-making. The system 170 can use the labeled data to assess outputs of the model 250 using different loss functions for each component of the model 250. Losses generated by the loss functions are then applied to the model 250 to update the various components. In this way, the system 170 is able to train the model 250 about human decision-making and integrate aspects of human decision-making within determinations about shared control of a vehicle.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the cognitive system 170, and/or the automated driving module 160 can be operatively connected to communicate with the various vehicle systems 140 and/or individual components thereof. For example, returning to FIG. 1, the processor(s) 110 and/or the automated driving module 160 can be in communication to send and/or receive information from the various vehicle systems 140 to control the movement, speed, maneuvering, heading, direction, etc. of the vehicle 100. The processor(s) 110, the cognitive system 170, and/or the automated driving module 160 may control some or all of these vehicle systems 140 and, thus, may be partially or fully autonomous.

The processor(s) 110, the cognitive system 170, and/or the automated driving module 160 can be operatively connected to communicate with the various vehicle systems 140 and/or individual components thereof. For example, returning to FIG. 1, the processor(s) 110, the cognitive system 170, and/or the automated driving module 160 can be in communication to send and/or receive information from the various vehicle systems 140 to control the movement, speed, maneuvering, heading, direction, etc. of the vehicle 100. The processor(s) 110, the cognitive system 170, and/or the automated driving module 160 may control some or all of these vehicle systems 140.

The processor(s) 110, the cognitive system 170, and/or the automated driving module 160 may be operable to control the navigation and/or maneuvering of the vehicle 100 by controlling one or more of the vehicle systems 140 and/or components thereof. For instance, when operating in an autonomous mode, the processor(s) 110, the cognitive system 170, and/or the automated driving module 160 can control the direction and/or speed of the vehicle 100. The processor(s) 110, the cognitive system 170, and/or the automated driving module 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module 160 can be configured to receive data from the sensor system 120 and/or any other type of system capable of capturing information relating to the vehicle 100 and/or the external environment of the vehicle 100. In one or more arrangements, the automated driving module 160 can use such data to generate one or more driving scene models. The automated driving module 160 can determine a position and velocity of the vehicle 100. The automated driving module 160 can determine the location of obstacles, obstacles, or other environmental features including traffic signs, trees, shrubs, neighboring vehicles, pedestrians, etc.

The automated driving module 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module 160 either independently or in combination with the cognitive system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module 160 can be configured to implement determined driving maneuvers. The automated driving module 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A cognitive system, comprising:
one or more processors;
a memory communicably coupled to the one or more processors and storing instructions that, when executed by the one or more processors, cause the one or more processors to:
acquire sensor data, including driver data about a driver of a vehicle and driving data about the vehicle and a surrounding environment of the vehicle;
encode, using a world encoder, the sensor data into a latent representation, the latent representation being encoded features of the sensor data within a defined latent space;
determine human decision-making characteristics that define at least an intent of the driver and latencies of the driver in making a decision according to the latent representation; and
generate a control signal that provides shared control of the vehicle according to the human decision-making characteristics and the latent representation, the shared control including blending driver control inputs with automated control inputs.

2. The cognitive system of claim 1, wherein the instructions to encode the sensor data into the latent representation include instructions to encode a latent state of the driver to integrate human decision-making within the latent representation.

3. The cognitive system of claim 1, wherein the instructions to determine the human decision-making characteristics include instructions to apply a decision model to predict human decision-making and latency in making a decision from the latent representation.

4. The cognitive system of claim 3, wherein the decision model implements one of nonlinear opinion dynamics and drift-diffusion modeling to infer what the driver is considering, limitations of the driver in relation to the human decision-making, and to account for latencies in making the decision, and wherein the instructions to determine the human decision-making characteristics include instructions to infer, using a dynamics model, a subsequent representation of the latent representation at a subsequent time step to further account for future considerations of the driver.

5. The cognitive system of claim 1, wherein the instructions to determine the human decision-making characteristics includes applying a decision model to generate outputs indicating the intent of the driver, preferences for decisions, and preferences for a mode of interaction according to the latent representation.

6. The cognitive system of claim 1, wherein generating the control signal includes applying a policy model that determines how to blend driver control inputs with automated control inputs for the shared control according to the human decision-making characteristics and the latent representation, and wherein the policy model is a semi-Markov model (SMM).

7. The cognitive system of claim 1, further comprising: training at least the world encoder and a policy model using a reward network that predicts rewards according to the latent representation, wherein training includes training a decision model using labeled data.

8. The cognitive system of claim 1, wherein the cognitive system is integrated within the vehicle that operates at least semi-autonomously.

9. A non-transitory computer-readable medium including instructions that, when executed by one or more processors, cause the one or more processors to:

acquire sensor data, including driver data about a driver of a vehicle and driving data about the vehicle and a surrounding environment of the vehicle;

encode, using a world encoder, the sensor data into a latent representation, the latent representation being encoded features of the sensor data within a defined latent space;

determine human decision-making characteristics that define at least an intent of the driver and latencies of the driver in making a decision according to the latent representation; and generate a control signal for providing shared control of the vehicle according to the human decision-making characteristics and the latent representation, the shared control including blending driver control inputs with automated control inputs.

10. The non-transitory computer-readable medium of claim 9, wherein the instructions to encode the sensor data into the latent representation include instructions to encode a latent state of the driver to integrate human decision-making within the latent representation.

11. The non-transitory computer-readable medium of claim 9, wherein the instructions to determine the human decision-making characteristics include instructions to apply a decision model to predict human decision-making and latency in making a decision from the latent representation.

12. The non-transitory computer-readable medium of claim 11, wherein the decision model implements one of nonlinear opinion dynamics and drift-diffusion modeling to infer what the driver is considering, limitations of the driver in relation to the human decision-making, and to account for latencies in making the decision, and wherein the instructions to determine the human decision-making characteristics include instructions to infer, using a dynamics model, a subsequent representation of the latent representation at a subsequent time step to further account for future considerations of the driver.

13. The non-transitory computer-readable medium of claim 9, wherein the instructions to determine the human decision-making characteristics includes applying a decision model to generate outputs indicating intent of the driver, preferences for decisions, and preferences for a mode of interaction according to the latent representation.

14. A method, comprising:

acquiring sensor data, including driver data about a driver of a vehicle and driving data about the vehicle and a surrounding environment of the vehicle;

encoding, using a world encoder, the sensor data into a latent representation, the latent representation being encoded features of the sensor data within a defined latent space;

determining human decision-making characteristics that define at least an intent of the driver and latencies of the driver in making a decision according to the latent representation; and generating a control signal that provides shared control of the vehicle according to the human decision-making characteristics and the latent representation, the shared control including blending driver control inputs with automated control inputs.

15. The method of claim 14, wherein encoding the sensor data into the latent representation includes encoding a latent state of the driver to integrate human decision-making within the latent representation.

16. The method of claim 14, wherein determining the human decision-making characteristics includes applying a decision model to predict human decision-making and latency in making a decision from the latent representation.

17. The method of claim 16, wherein the decision model implements one of nonlinear opinion dynamics and drift-diffusion modeling to infer what the driver is considering, limitations of the driver in relation to the human decision-making, and to account for latencies in making the decision, and wherein determining the human decision-making characteristics includes inferring, using a dynamics model, a subsequent representation of the latent representation at a subsequent time step to further account for future considerations of the driver.

18. The method of claim 14, wherein determining the human decision-making characteristics includes applying a decision model to generate outputs indicating the intent of the driver, preferences for decisions, and preferences for a mode of interaction according to the latent representation.

19. The method of claim 14, wherein generating the control signal includes applying a policy model that determines how to blend driver control inputs with automated control inputs for the shared control according to the human decision-making characteristics and the latent representation, wherein the policy model is a semi-Markov model (SMM).

20. The method of claim 14, further comprising:

training at least the world encoder and a policy model using a reward network that predicts rewards according to the latent representation, wherein training includes training a decision model using labeled data.

* * * * *